(12) United States Patent
Blenkinsopp et al.

(10) Patent No.: US 12,485,564 B2
(45) Date of Patent: Dec. 2, 2025

(54) ACTIVE SAFETY APPARATUS FOR A DISC CUTTER

(71) Applicant: KANDO INNOVATION LIMITED, Auckland (NZ)

(72) Inventors: Keith Blenkinsopp, Auckland (NZ); George Davey Maddever, Auckland (NZ)

(73) Assignee: KANDO INNOVATION LIMITED, Auckland (NZ)

( * ) Notice: Subject to any disclaimer, the term of this patent is extended or adjusted under 35 U.S.C. 154(b) by 79 days.

(21) Appl. No.: 18/558,341

(22) PCT Filed: Aug. 4, 2022

(86) PCT No.: PCT/NZ2022/050100
§ 371 (c)(1),
(2) Date: Oct. 31, 2023

(87) PCT Pub. No.: WO2023/014232
PCT Pub. Date: Feb. 9, 2023

(65) Prior Publication Data
US 2024/0227230 A1 Jul. 11, 2024

(30) Foreign Application Priority Data
Aug. 4, 2021 (NZ) ........................ 778784

(51) Int. Cl.
*B26D 7/24* (2006.01)
*B26D 1/14* (2006.01)
*B26D 5/00* (2006.01)

(52) U.S. Cl.
CPC ................. *B26D 7/24* (2013.01); *B26D 1/14* (2013.01); *B26D 5/007* (2013.01); *B26D 2210/02* (2013.01)

(58) Field of Classification Search
CPC . B26D 7/24; B26D 1/14; B26D 5/007; B26D 2210/02; B23D 59/001;
(Continued)

(56) References Cited

U.S. PATENT DOCUMENTS 7,924,164 B1   4/2011   Staerzl
11,221,104 B2 *  1/2022   Rothenaicher .......... G05B 9/02
(Continued)

FOREIGN PATENT DOCUMENTS

WO   2017196187 A1   11/2017

OTHER PUBLICATIONS

International Search Report for PCT/NZ2022/050100 mailed Oct. 31, 2022, 4 pages.
(Continued)

*Primary Examiner* — Ghassem Alie
(74) *Attorney, Agent, or Firm* — NIXON & VANDERHYE

(57) ABSTRACT

An active safety apparatus adapted for a disk or circular knife or saw is based on optical surveillance apparatus. The apparatus provides a precise boundary for a protected volume surrounding the blade. The apparatus creates four corner edges for the protected volume, which is a cuboid or a right frustrum. Appearance of an operator hand, recognized by glove color, in the protected volume causes immediate, active stopping of a servomotor used to rotate the saw blade.

5 Claims, 2 Drawing Sheets

(58) Field of Classification Search
CPC ...... B23D 59/002; B27B 5/38; G06V 10/147;
G06V 10/751; G06V 10/56; B27G 19/02;
B27G 19/04; B27G 21/00; F16P 3/142;
F16P 3/144; B23Q 17/2438; B23Q
11/0082
USPC .......... 83/63, 58, 397, 477.2, 62, 76.1, 76.8;
340/573.1, 680, 541, 686.6; 382/100, 162
See application file for complete search history.

(56) References Cited

U.S. PATENT DOCUMENTS

| | | |
|---|---|---|
| 2006/0096425 A1 | 5/2006 | Keller |
| 2006/0101960 A1 | 5/2006 | Smith et al. |
| 2007/0085502 A1* | 4/2007 | Graves .................... F16P 3/142 |
| | | 307/116 |
| 2010/0011926 A1 | 1/2010 | Murakami et al. |
| 2010/0037739 A1 | 2/2010 | Anderson et al. |
| 2010/0300256 A1 | 12/2010 | Loewe et al. |
| 2015/0217421 A1 | 8/2015 | Gass |
| 2017/0252939 A1* | 9/2017 | Blenkinsopp ........... F16P 3/142 |
| 2017/0312837 A1 | 11/2017 | Gass et al. |
| 2019/0234559 A1 | 8/2019 | Guynn et al. |
| 2020/0072413 A1* | 3/2020 | Stoppenbrink .... B23Q 11/0082 |
| 2020/0368914 A1 | 11/2020 | Schröder et al. |

OTHER PUBLICATIONS

Written Opinion of the ISA for PCT/NZ2022/050100 mailed Oct. 31, 2022, 7 pages.

* cited by examiner

ACTIVE SAFETY APPARATUS FOR A DISC CUTTER

CROSS-REFERENCE TO RELATED APPLICATIONS

This application is the U.S. national phase of International Application No. PCT/NZ2022/050100 filed Aug. 4, 2022 which designated the U.S. and claims priority to NZ 778784 filed Aug. 4, 2021, the entire contents of each of which are hereby incorporated by reference.

FIELD

A power-driven disc cutter of the type known as a circular saw or a circular knife, having an imaging detection system adapted to detect a imminent risk of injury by the cutter to an operator and on detection, cause the motor to be stopped.

Definitions

"Disc saw" (or "disc cutter" or "circular saw") refers to a cutting machine having a circular disk bearing a cutting edge at its periphery. It may be a toothed saw or a circular knife. The disk is rotated at speed during use while material to be cut is held against the edge.

"Instant". In this document, the sense of this term means a duration of ten to fifteen milliseconds or less.

"Exclusion volume" refers to a volume about the disc cutter blade. The active safety apparatus is devised to stop the disc cutter from rotating if the operator's hand or hands are detected inside the exclusion volume and in proximity to the blade.

Problem to be Solved

For a motorised disc saw or cutter, the inventors desire to prevent hand injury to an operator that could be caused by contact with the blade.

BACKGROUND

A circular or disc saw or cutter is a motorized cutting device for cutting wood, metal, and for this document, to cut meat, fish and poultry items within a packing plant. But a device that can cut meat can cut an operator's hand just as quickly, with dire consequences.

A main requirement of protective apparatus for a cutting machine such as a disc saw or cutter is that "there must be zero risk that the user can suffer trauma from inadvertent contact with the spinning blade."

A realistic apparatus includes reliable detection. Failure to detect, or to respond in time to a dangerous situation greatly increases a risk of trauma. The rapidity of the cutting process allows very little time to establish that a risk situation exists and then to deal with it.

For a disc cutter, safety protection requires that the spinning blade, having significant rotational inertia, be instantly either brought to a complete stop, or physically retracted from a region currently filled by the operator's hands.

A risk factor is that in a meat processing factory, where the user repeats the same movements for an extended period of time and is likely to become fatigued, improper hand placement is more likely.

PRIOR ART

Solutions to the problem of making a disc cutter or saw safe fall into three groups: (a) ways to detect a hazardous situation, for which a "video curtain" solution is most relevant, (b) and on detection, cause the cutter to stop or (c) on detection, cause the cutter to be displaced away from contact.

Prior-art detection solutions for disc saws often rely on detection of electrical contact, having the disadvantage that rather dramatic steps must then be taken to quickly stop the blade.

A) Optical detection for disc cutter blades.
 (i) Keller in US2006/0096425 describes a disc saw in a carpenter's saw bench. A video proximity sensor is claimed to recognise a hand. In event of perceived risk, an explosive charge held inside a replaceable cartridge drives a pin through the blade.
 (ii) Although not applied to a disc saw and lacking any effector, Staerzl in U.S. Pat. No. 7,924,164 describes a way to restrict the active area scanned by a colour video camera using frame and line-synchronised gating of the NTSC standard video signal.
 (iii) Murakami et al in US2010/0011926 describe a colour-sensitive camera surveillance device for a disc saw in a saw bench. Once a number of pixels having a common, predetermined colour are found by a controller, the (unspecified) motor driving the disk saw is stopped.
 (iv) Gass et al in US2015/0217421 uses a "Leap Motion" hand tracker using two 640×240 pixel near infra-red cameras; rates up to 2 kHz as one alternative.
 (v) Loewe et al in US2010/0300256 describe a camera-based surveillance for a disc saw. An outer warning zone is managed by a camera, and an inner action zone is managed by a non-imaging sensor. Heat radiation from a hand may be sensed. A path of motion for a hand upon a saw bench can be calculated.
(B) Blade stopping group.
 (i) Keller's method must destroy the blade when stopped, and is not compatible with food hygiene in that explosives residue and metal fragments may find their way into food products.
 (ii) Gass et al in US2015/0217421 forces a brake block against the blade edge from underneath the saw bench to stop the blade.
 (iii) Self-braking motors that apply a brake as soon as the drive power is interrupted are known, but are likely to be too slow.
(C) Gass provides retraction in US 20170312837, which makes use of the angular momentum of a spinning disc saw to shift the blade away from contact by shifting the arbor of the saw.

STATEMENT OF INVENTION

In a first broad aspect the invention comprises a power-driven disc cutter equipped with active safety apparatus having a rotatable circular blade with a cutting edge at the periphery, a shaft holding the blade held in an arbor attached to a frame and rotated by a motor, the frame supporting an optical imaging portion of the active safety apparatus for surveilling a region including the periphery, wherein the apparatus creates a protective exclusion volume in proximity to the blade, the volume having the shape of either a right frustrum or a cuboid and having corner edges defined by the apparatus; the apparatus is configured to detect an object having predetermined optical characteristics within the exclusion volume and to make a SIGNAL; said SIGNAL is connected to cause a motor control portion of the active safety apparatus to instantly stop the motor, so that, when in use, incursion of the object into the exclusion volume causes the disc cutter to stop rotating.

Preferably each defined corner edge of the exclusion volume comprises an optical axis of a portion of the optical imaging portion of the active safety apparatus.

Preferably the optical imaging and control apparatus supports operation in at least two modes where a first mode comprises surveillance of the exclusion volume and production of the SIGNAL on detection of the object, and a second mode comprises surveillance beyond the exclusion volume and production of a warning on detection of the object, together with rapid alternation between the first mode and the second mode.

Preferably the optical imaging portion of the active safety apparatus includes a camera with a lens, and includes four series of mirrors; each series receiving a bundle of rays from the region at one of four spaced-apart positions and directing the bundle laterally and then into a lens of the camera as one of four contiguous bundles of rays; each bundle of rays having an optical axis that defines a corner edge of the exclusion volume; each bundle is focused by the lens onto a position defined upon a surface of an imaging chip of the camera and, when in a first mode, an image of the exclusion volume is obtained from an area defined by the four positions.

Preferably the optical imaging portion of the active safety apparatus includes a control processor capable when in use of determining at least a minimum number of picture elements or pixels having a predetermined set of qualities including colour and brightness as indicating a presence of the object inside the exclusion volume and of making the SIGNAL when the minimum number is equalled or exceeded.

Alternatively the optical imaging portion of the active safety apparatus includes a set of four spaced-apart cameras all directed at the region and each optical axis is projected through a lens of each camera.

In a further aspect, the optical imaging portion of the active safety apparatus includes a control processor capable when in use of receiving image data from said at least one camera and to make a SIGNAL on discerning in an image at least a minimum number of pixels sharing a predetermined quality as compared to a background of either objects to be sawn, or a saw bench.

Preferably contiguous pixels are counted.

Preferably the predetermined quality is a colour contrast between a gloved hand and surrounding material; for a flesh item a blue or green latex glove is preferred.

Preferably the minimum number of pixels shall be based on a count of contiguous pixels.

Preferably the predetermined quality is a colour contrast between a gloved hand and surrounding material.

Optionally the active safety apparatus also accepts a connection from a conductive glove contact as an input for making the SIGNAL.

Preferably the motor is a controllable motor controlled by the motor control apparatus.

More preferably, the controllable motor is a servo-motor and the motor control apparatus is capable when in use of causing an active stop of the motor.

Optionally the controllable motor is a braking motor configured to apply an internal brake to a rotor on cessation of a power input and the motor control apparatus comprises an electrically controlled circuit breaker responsive to the SIGNAL.

PREFERRED EMBODIMENT

The description of the invention to be provided herein is given purely by way of example and is not to be taken in any way as limiting the scope or extent of the invention. The apparatus and operation have been described in an illustrative manner, and it is to be understood that the terminology which has been used is intended to be in the nature of words of description rather than of limitation.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. Each document, reference, patent application or patent cited in this text is expressly incorporated herein in their entirety by reference. Reference to cited material or information cited in the text should not be understood as a concession that the material or information was part of the common general knowledge or was known in New Zealand or in any other country.

LIST OF DRAWINGS

The apparatus described in these Examples would be suitable as a disc cutter in a poultry meat factory. Such a workstation is shown, in use, in the Youtube video "How to cut a whole chicken" downloaded on 15 Jul. 2021, https://www.youtube.com/watch?v=KOyc65T50pY.

Figure 1:
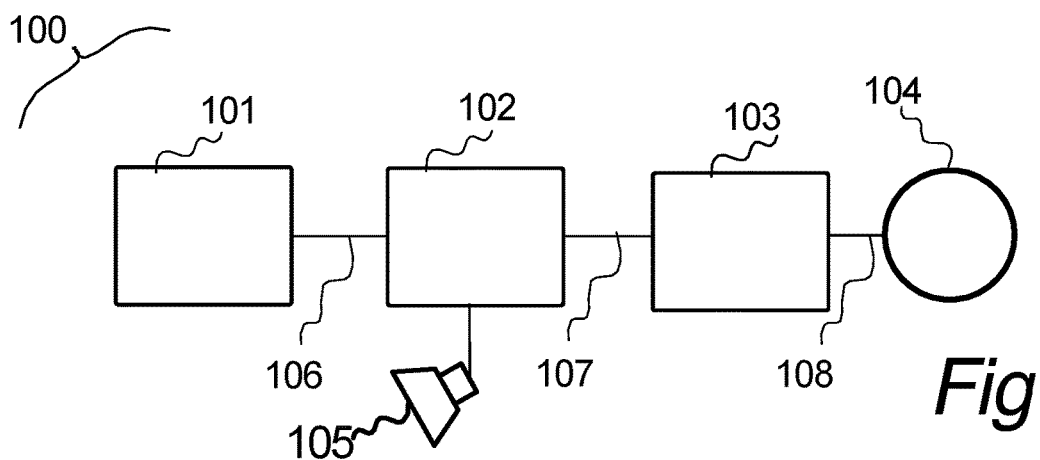
FIG. 1 is a block diagram of the parts of the of the active safety apparatus.

FIG. 1 is a block diagram 100 of connections between the operational parts of the active safety apparatus. 101 comprises image capture means; one or more video cameras that are preferably machine-vision colour cameras. Connection 106 carries control data to the camera or cameras, and carries image data, typically in digital form, from the camera or cameras to a video controller or processor 102. The video controller or processor is programmed to send a 150 SIGNAL 107 to a motor controller 103, preferably to an input designated as an "immediate stop" input, if an alarm condition exists as described below. That SIGNAL may simply be a change in logical state of a signal wire or a "STOP" command, likely to use an Ethernet link. The video controller or processor may activate an audible or visual alarm 105 under pre-alarm conditions. The motor controller supplies power to a motor 104, coupled directly or 155 indirectly to a cutter blade, and actively causes the motor to come to an instant halt if the motor controller receives the SIGNAL.

Figure 2:
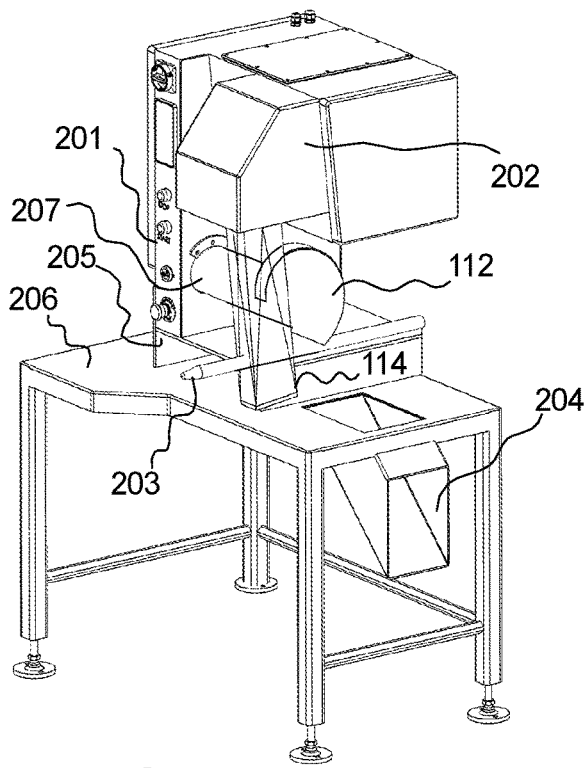
FIG. 2 is an oblique view of a workstation with a disk cutter for poultry carcass work.

FIG. 2 is an oblique view of the invention in use, in a poultry processing workstation. A support frame 205 maintains a circular cutter 112 in a position in relation to a physical bench top 206 and maintains glove proximity detection equipment, especially optical imaging apparatus housed inside a cover at 202, in relation to the blade. Motor controls such as start, stop and reset are provided at 201. A support shaft 203 is often used as a rest on which to advance a carcass during poultry processing. Chute 204 receives cut-apart carcasses. The cutter blade rotates in an arbor having suitable bearings and a drive shaft is protected inside a cover 207.

The cover 202 above the cutter blade includes lighting to flood the working area from locations close to the optical axis of each ray path. Enough white light-emitting diodes are used to provide about 1500 lumens of light, to ensure that the video camera or cameras used produce a clear signal with little noise. Shadows are minimized. Good lighting also helps the operator.

According to the invention, the optical imaging and control apparatus, when in use, creates a protective exclusion volume having well-defined corner edges that contains the cutter blade and reacts instantly to any incursion.

A colour contrast between the or each gloved worker's hand and the workpiece being cut is preferred. An alarm condition is generated if enough of any object having predetermined optical characteristics; in particular a green or blue glove, is resolved by the camera assembly and recognized to lie within the exclusion volume. It is already conventional for operators to wear blue or green latex gloves in the meat industry.

Figure 3:
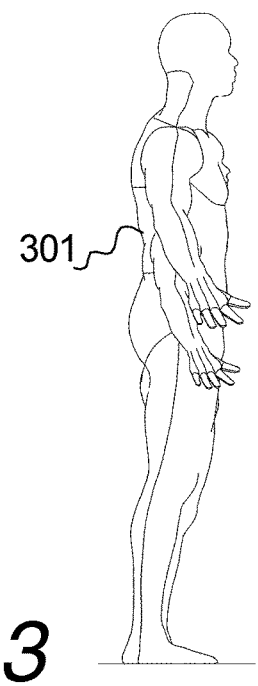
FIG. 3 is an elevation view of the workstation from the right side.
Figure 3:
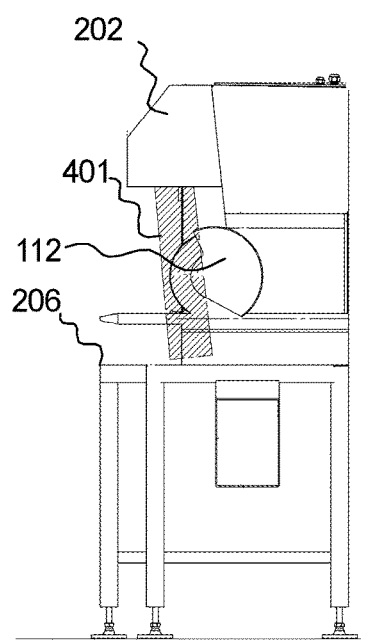

FIG. 3 shows an operator in front of the poultry processing workstation, in a side elevation view. The protected area, shown with hatching, encloses the exposed part of the cutter blade 112. The work surface 206 is typically 600 mm above the floor. The following paragraphs describe how the present invention is able to precisely define the zone to be protected as a cuboidal exclusion volume in order to protect the operator's hands from trauma. The invisible exclusion volume is here shown as a hatched cube.

Figure 4:
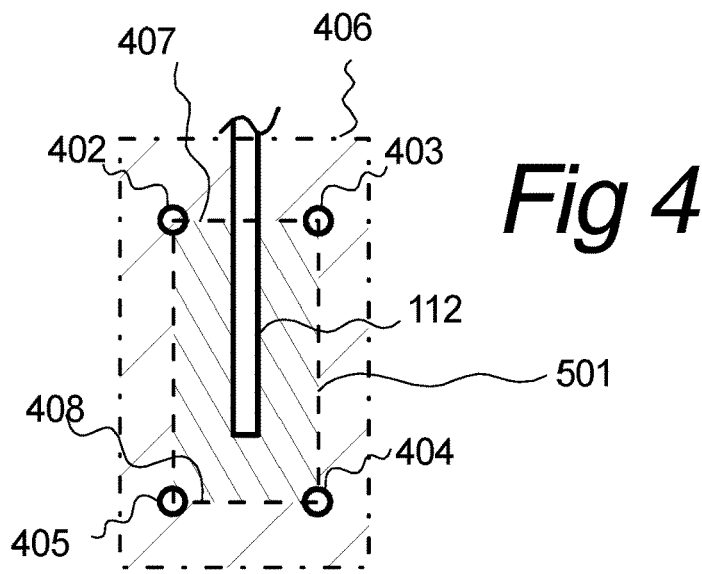
FIG. 4 is a diagram of the two functional zones around the blade.

FIG. 4 is a diagram showing the exclusion volume as zones surrounding an edge of the disc blade 112. The edge of the exclusion volume, shown by shading inside rectangle 501, is delimited by four invisible optical axes 402, 403, 404 and 405 which serve as corner edges. The zones shown in this sectional drawing are invisible to the operator unless, in an option for the invention, light beams are projected on to the working area such as along the line 501 or at the four optical axes. That may be done continuously or only when a Mode 2 incursion is detected. Modes are described in more detail below.

Figure 5:
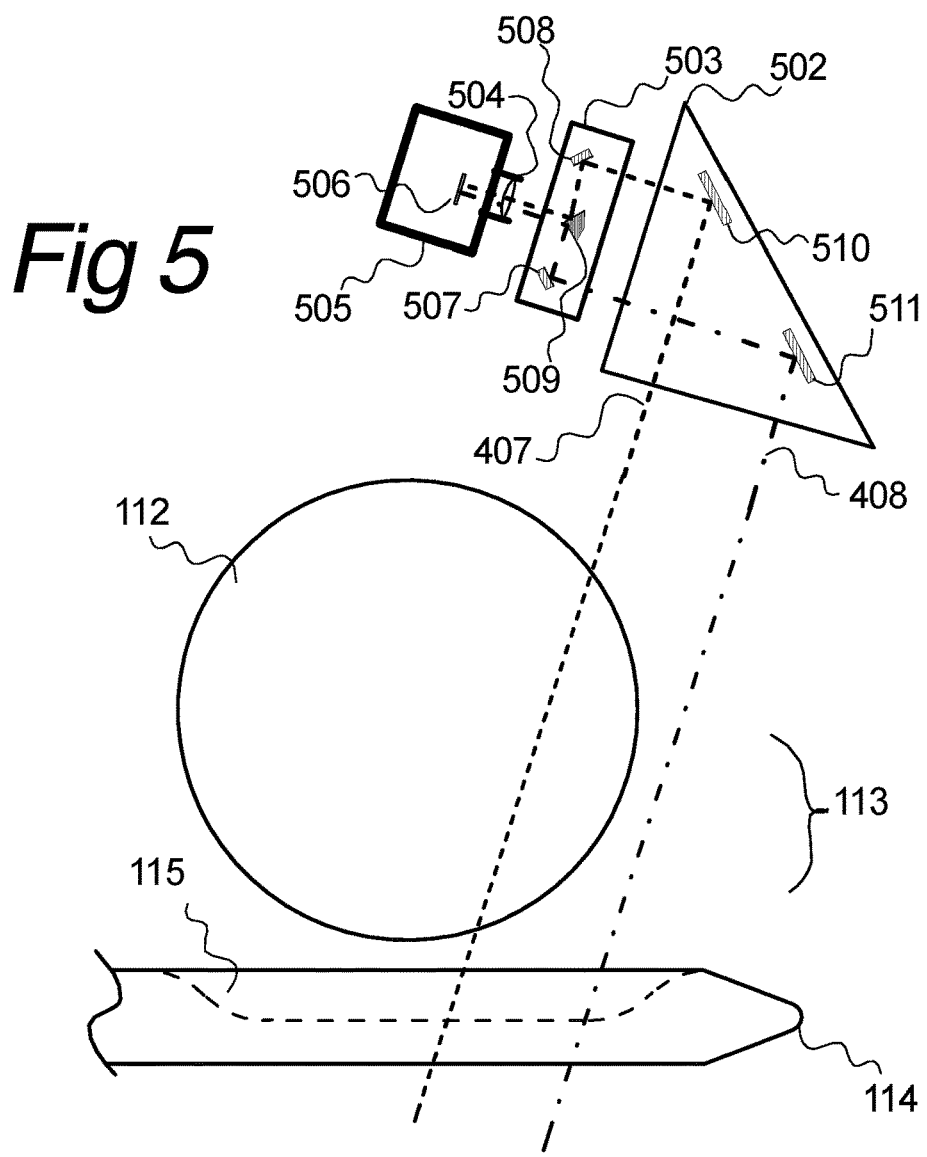
FIG. 5 is a side elevation diagram of the cutter and the optical surveillance components.

Each optical axis is created by designating a corner of an area for partial readout upon the sensor chip within the camera and each axis is then produced from the chip through a lens and mirrors as shown in FIG. 5 and discussed below. For a selected camera (described below), the 630×630 pixel area of the sensor chip of the camera may be selectively read out as either (in Mode 1) from pixel x=157, pixel y=157 to x=472, y=472 to transmit an image arriving on the central part of the chip, or is read out from x=0, y=0 to x=630, y=630 to view the entire chip in Mode 2. If a given camera does not support selective readout, the separation can instead be done within a frame memory in the processor 102. Other cameras might allow more than one part of the image sensor chip to be read out together.

The shape of the exclusion volume may be, as shown in FIG. 4, elongated along the length of the blade; more appropriate for a disc cutter. Cylindrical lenses or curved mirrors can be included to "stretch" the exclusion volume along one axis as required.

The outer volume 406 surrounding the border 501 of the exclusion volume is also watched in Mode 2. An image of any object having predetermined optical characteristics; in particular the operator's coloured gloved hand or hands, will cause a warning to be emitted by the warning device 105, if the operator's hands come near but are outside the boundary 401 of the exclusion volume. Mode 2 is described below.

Illustrative timing and dimensions are now given. Assuming that the apparatus of this specification is capable of bringing the cutter blade to a stop in 10 milliseconds after an image of the target item is first evident, a 40 mm distance between blade 112 and an adjacent exclusion volume boundary 401 should protect the operator from contact with a moving blade as long as a hand velocity of 4 metres per second (9 miles per hour) is not exceeded. The inventors are able to adjust all settings by remote re-programming of the processor 102 through an internet connection. For one example, the mean size of items being cut may vary from time to time, and the 40 mm distance may be changed.

Preferred machine-vision cameras are relatively sensitive, have fast scanning rates, and are colour cameras. The presently preferred type is: "Teledyne FLIR Blackfly S USB3" Model: BFS-U3-04S2C-CS: from FLIR Systems UK; 2 Kings Hill Avenue—Kings Hill, West Malling, Kent ME19 4AQ, United Kingdom. The camera has a 630×630 pixel array on a square image sensor that is about 0.8 cm long on a side. That camera can be operated at up to 522 frames per second and provides for readout from selected areas of the square image sensor. Preferred lenses are used with relatively bright lighting to allow the noise content of the image to be decreased.

The invention provides two camera configurations capable of creating and monitoring a preferred protective exclusion volume. Both configurations define each corner edge of the exclusion volume as a separate optical axis derived from the optical imaging apparatus.

In a preferred camera configuration a single machine-vision colour camera employs four separate series or trains of mirrors feeding into a single lens as described below in relation to FIG. 5. Each train of mirrors carries one optical axis from an origin upon the camera chip to become projected along a corner edge of the protected volume and pass through the working area 113. Four optical axes, 402, 403, 404 and 405 are provided. Preferably the axes are made parallel, making the surveilled volume a cuboid rather than a right frustrum. Having parallel sides is believed to make it easier for the operator to know where the borders of the exclusion volume are. In relation to the cutter blade, two corner edges, 402 and 403 define the far end of the surveilled volume and mark the sides, along with two corner edges 404 and 405 that also define the near end.

The elevation view of FIG. 5 shows a selected camera 505 and lens 504 and an image sensor surface or chip 506. Mirrors are preferably front-silvered and preferably are protected with a coating for a longer life. Note that in this side view only two of the four mirror trains and optical axes are drawn, and some of the ray paths are at a diagonal. For example, the sensor is operated to create four points each along a diagonal and half-way from the centre to a corner of the chip. Each point is an origin of an artificial optical axis. The lens 504 serves the usual purpose of focusing objects from around the blade on to the camera sensor chip 506. As the bundles of rays pass between mirror group 509 and the lens 504 they remain as four contiguous but not overlapping bundles each destined to land upon the image sensor chip 506 around one of the four points. It is better to have the ray bundles slightly separated than to have them overlapping. Each bundle of rays includes an optical axis and passes through a series of mirrors that perform a lateral and diagonal displacement of each bundle by a first deflection (such as the distance between mirrors 508 and 509), and then a second deflection of the bundle (such as with mirrors 507 and 508) toward an active area including the disc cutter. A third mirror group 510, 511 is optional but the folding (which may be other than a 90 degrees deflection) makes the optical assembly more compact. inside enclosure 502. The mirror group including 510, 511 may be deleted if the camera and laterally shifting mirrors can be pointed directly in line at the exclusion volume. Note that the four optical axes, two of which are shown at 407, 408 in FIG. 5 comprise four spaced-apart viewpoints each having an optical axis that determine the dimensions of the exclusion volume, subject to amendment by software of the positions of the four points upon the camera image sensor surface.

FIG. 5 does not show that the optical assembly including the camera is encased within a sealed, dry enclosure having a clear observation window to admit light from the working area 113.

The exclusion volume 501 is located below the mirror assembly 502, inside the workspace 113 and about the support shaft 114. The edge of the support shaft usually includes a slot 115 to receive the edge of the cutting blade. The volume will be incompletely filled with ray bundles at the end closer to the mirrors because each ray bundle diverges. An optional slant of the exclusion volume is provided; the slant as shown is in order to include the lower part of the volume 113, under the cutter edge. It is thought that the portion of the exclusion volume near the support shaft slot 113, below the cutter disc is the most hazardous volume. Only two edges of the exclusion volume 407 and 408 are shown in FIG. 5. The other two are obscured. The exclusion volume may be called an exclusion cuboid if the corner edges are parallel.

A second example camera configuration uses four separate cameras, and either a first deflecting mirror array such as mirrors 510, 511, or the four camera lenses are oriented in order to view the exclusion volume directly. In this version, the centre of each image sensor is the origin of one optical axis such as 402, 403, 404 and 405. Providing four optical axes that together define the exclusion volume is the common aspect of both examples. The 275 central quadrant of each sensor (between the centre and a corner) is read out when in Mode 1, and the entire chip is read out when in Mode 2. Hence there are four sensors, one in each camera, to be read from in either mode. It will be appreciated that the first example camera configuration is more likely to provide an economical solution to the problem to be solved for a motor-driven disc cutter especially as camera specifications are improved.

Modes

Like the Applicants' earlier PCT/NZ2017/050044, the optical imaging and control apparatus switches as quickly as from one frame to the next between Mode 1 and Mode 2. The apparatus optionally scans the exclusion volume under Mode 1 more often, such as 11121112 . . . . Given the rapid frame scan rate of the preferred camera or equivalents, a newly arrived target item will be detected inside the exclusion volume within a few milliseconds.

Mode 1 will stop the blade by making the SIGNAL along connector 107 if a gloved hand is found inside the exclusion volume, while Mode 2 collects the entire image and emits a visual or aural warning from device 106 if a gloved hand is found. In Mode 1 the processor 102 sets the camera readout parameters so that the only video returned from the camera is that representing the exclusion zone 501, bounded by the four optical axes as corner edges 402, 403, 404 and 405 (FIG. 4). The video image is analysed immediately for indications that a gloved hand is too close to the blade.

Although it requires some memory and computation to compare adjacent pixels over an array, the preferred parameter is a count of "contiguous pixels having the selected colour" using well-known image processing algorithms.

Another check against spurious responses is that if an aggregation of selected pixels is found, major and minor axes of the aggregation are determined such as in X and Y directions, and both should be greater than 2. That rejects aberrant responses to lines.

If the count exceeds a predetermined number, and Mode 1 is operational, the processor sends the SIGNAL to the motor controller to cause the motor and hence the blade to stop turning. Any gloved hand inside the exclusion zone 501 is deemed to be in hazardous proximity to the disc cutter blade. Less computation is required to simply count all received pixels that have a selected contrasting colour or other optical characteristic. At this time the invention simply decides if the gloved hand is anywhere within the exclusion volume, or not.

In Mode 2 the early warning zone 406 is also surveilled. That zone extends outward from the exclusion volume 501 to comprise substantially the entire camera view, including the exclusion volume and a surrounding volume the dimensions of which are limited by the focal length of the lens and the size of the image sensor, or by mirror areas. Activation may be signalled to the operator by (for example) a sound 105, a bright light, or by activating a projected image or laser illumination of the edges 501 of the exclusion volume down from the shroud and on to the workspace. The surrounding volume 406 preferably also has reasonably defined external boundaries since the operator may use it to confirm the position and the functionality of the exclusion volume. Fast and frequent changes of mode ensure that the invention will detect and respond to every incursion.

Drive for the Cutter Blade.

The currently preferred option for driving the disc cutter in rotation is a servo-motor having a matched controller. A typical rate is 1500 rpm. The preferred Ethernet-compatible motor controller can actively bring rotation to a halt in 10-15 milliseconds after receiving the SIGNAL 107 from the processor 102.

The inventors currently prefer a "Vector Servo-System" servomotor having a power rating of 3 KW, rated at 9.5 amps, and running at 1,500 rpm. (Shenzhen Vector Technology Co., Ltd. Beckhoff of Germany is another supplier). The motor is connected to the blade along a shaft passing within a protective cover 207 and a resilient coupling pr flexible joint is preferred. A 1:1 belt drive is an option. The power rating of the motor is sufficient to perform an active stop within an acceptable time. The associated controller provides for an "instant stop" or "quick step electronic step function" command which is referred to elsewhere in this document as the "SIGNAL". The rotational inertia of a typical blade in operation has been calculated as about 7000 kilogrammes per mm$^2$.

A conductive glove, if also used, is connected through an interface to the controller so that a conduction event will always activate the SIGNAL. Some operators will insist on such a backup for their own feeling of security. The sensing method typically looks for passage of current from the conductive glove to the grounded blade which is held at a different electrical potential.

The motor may be a self-braking induction motor having a single or three-phase connection. Such motors are designed to bring the rotor to a halt within about 100 milliseconds after interruption of power, in this case in response to the SIGNAL. Brands of self-braking motor include Motive.srl and Neri Motori in Italy, and Bodine in the United States. The inventors would include a rotation sensing transducer on the motor shaft and would devote a section of the controller to running a process to determine stopping time and to prevent use of the workstation if the braking performance of the self-braking motor becomes unacceptable. At this time, such motors appear to be not fast enough, although faster self-braking motors may be developed.

Advantages

The invention allows the operator a longer working career before injury.

Optical detection of a blue glove in proximity, inside the exclusion volume, does not carry as much urgency to bring the blade to an immediate standstill as would prior-art apparatus reliant on detecting actual contact of a glove with the blade. As a result, peak power requirements are lower.

The invention brings the intact blade to a stop under active control, over a defined time. That does not require replacement of a sacrificial element destroyed as part of a stopping event.

The invention provides a defined exclusion volume in a constant position about the working blade, which may also be surrounded by a warning volume.

In an option, the invention provides a warning before the gloved hand enters the exclusion volume.

The invention provides a defined exclusion volume having closely controlled edges about the cutter blade.

The volume may become an exclusion cuboid having parallel sides if the optical parts are adjusted accordingly.

Finally it will be understood that the scope of this invention as described and illustrated herein is not limited to the specified embodiments described. Those of skill will appreciate that various modifications, additions, known equivalents, and substitutions are possible without departing from the scope and spirit of the invention as set forth in the following claims.

We claim:

1. A power-driven disc cutter configured for cutting a workpiece, the cutter comprising:
   a frame;
   an arbor attached to the frame;
   a supporting shaft supported in the arbor
   a rotatable disc blade with a cutting edge held on the supporting shaft;
   a controllable motor connected to rotate the supporting shaft;
   a safety apparatus operatively connected to the controllable motor, the safety apparatus comprising an optical imaging portion connected to the frame, the optical imaging portion being configured to sense a gloved hand within an exclusion volume that includes the cutting edge, the optical imaging portion comprising:
   a single camera having an image sensor chip;
   a lens aligned with the sensor chip and positioned to focus incoming light onto the sensor chip;
   four sets of mirrors arranged to project, respectively, four separate views of the exclusion volume, each of the four sets of mirrors comprising:
   a first mirror configured to reflect a corresponding one of the four separate views toward an optical axis of the lens; and
   a second mirror configured to receive the corresponding one of the four separate views reflected by the first mirror and reflect the corresponding one of the four separate views along a respective one of four separate optical axes passing through the lens;
   wherein the optical imaging portion is configured so that each of the four separate views of the exclusion volume is focused on a respective one of four separate, non-overlapping portions of a surface of the image sensor chip; and
   wherein each of the four separate optical axes associated with the four second mirrors defines a corner edge of the exclusion volume, the exclusion volume having a shape of either a right frustrum or a cuboid.

2. The power-driven disc cutter of claim 1, wherein each of the four sets of mirrors further comprises a third mirror configured to reflect light from in or near the exclusion volume obtained at an angle to the optical axis of the lens toward the first mirror.

3. The power-driven disc cutter of claim 1, further comprising a control processor connected to receive data from the imaging chip, the control processor being configured to identify a presence of the gloved hand within or near the exclusion volume by detecting at least a minimum number of contiguous pixels representing the gloved hand when wearing gloves having a distinctive color as compared to a color of a workpiece.

4. The power-driven disc cutter of claim 3, wherein the control processor is configured so that during operation in a first mode of two rapidly alternating modes to read the data from a portion of the imaging chip located inside a rectangle delimited by the position of the four separate optical axes upon the imaging chip and, if the gloved hand is identified, to emit a command signal having an effect of causing a motor control portion of the safety apparatus to stop the controllable motor.

5. The power-driven disc cutter of claim 4, wherein the control processor is configured so that during operation in a second mode to read an entire surface of the imaging chip and, if the gloved hand is identified, to emit a warning thereby when in use advising the operator that a hand is near the protected volume.

* * * * *